United States Patent [19]
Jolma et al.

[11] Patent Number: 5,806,003
[45] Date of Patent: Sep. 8, 1998

[54] METHOD FOR ADJUSTING TRANSMISSION POWER IN A CELLULAR RADIO SYSTEM AND A SUBSCRIBER EQUIPMENT

[75] Inventors: Petri Jolma, Oulu; Ilkka Keskitalo, Jääli; Arto Kiema; Jari Savusalo, both of Oulu, all of Finland

[73] Assignee: Nokia Telecommunications Oy, Espoo, Finland

[21] Appl. No.: 591,571

[22] PCT Filed: Jul. 12, 1994

[86] PCT No.: PCT/FI94/00321

§ 371 Date: Jan. 11, 1996

§ 102(e) Date: Jan. 11, 1996

[87] PCT Pub. No.: WO95/02950

PCT Pub. Date: Jan. 26, 1995

[30] Foreign Application Priority Data

Jul. 14, 1993 [FI] Finland ................................ 933209

[51] Int. Cl.$^6$ ....................................... H04B 7/26
[52] U.S. Cl. ........................ 455/522; 455/69; 370/337
[58] Field of Search .................. 455/33.1, 34.1, 455/53.1, 54.1, 54.2, 56.1, 62, 67.1, 68, 69, 70, 73, 89, 126, 422, 450, 455, 517, 522, 524; 370/321, 337, 347, 442, 522

[56] References Cited

U.S. PATENT DOCUMENTS

| 5,212,823 | 5/1993 | Fujii et al. . |
| 5,278,992 | 1/1994 | Su et al. ..................................... 455/69 |
| 5,455,964 | 10/1995 | Roos et al. ............................ 455/54.2 |
| 5,487,180 | 1/1996 | Ohtake ...................................... 455/69 |

FOREIGN PATENT DOCUMENTS

| 0 462 601 | 12/1991 | European Pat. Off. . |
| 0 515 335 | 11/1992 | European Pat. Off. . |
| 0 536 099 | 4/1993 | European Pat. Off. . |
| 92/16059 | 9/1992 | WIPO . |
| 93/07702 | 4/1993 | WIPO . |

*Primary Examiner*—Thanh Cong Le
*Attorney, Agent, or Firm*—IP Group of Pillsbury Madison & Sutro LLP

[57] ABSTRACT

Transmission power control of a mobile terminal unit in a cellular telecommunication system, in which: the base station informs the mobile units of its existence on a common control channel in a TDMA slot, at least one control channel is dedicated to the mobile terminals seeking connection, and the power level of the connection-seeking signal is dependent of the measured power level, downlink, from the base station.

2 Claims, 4 Drawing Sheets

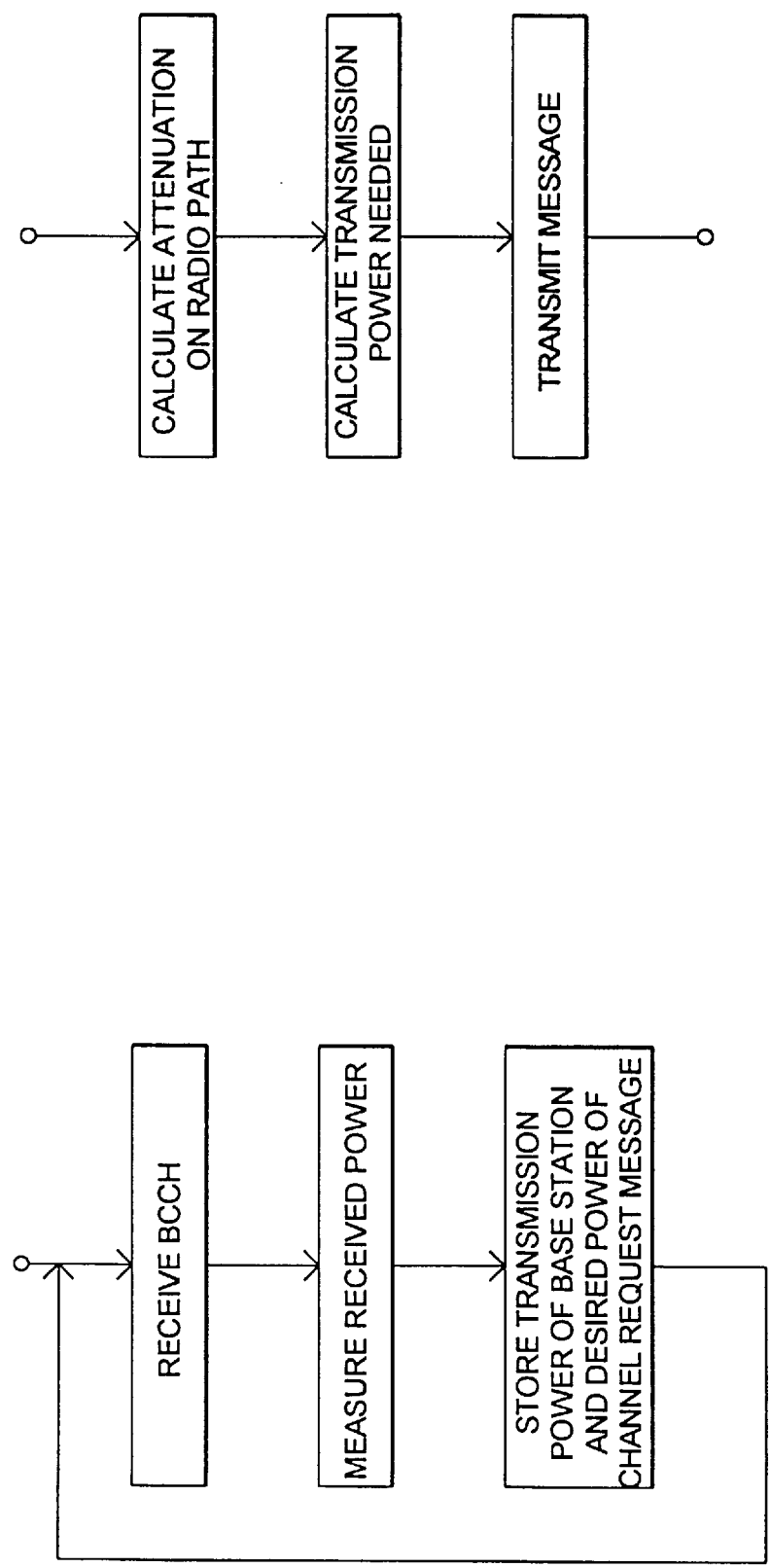

METHOD FOR ADJUSTING TRANSMISSION POWER IN A CELLULAR RADIO SYSTEM AND A SUBSCRIBER EQUIPMENT

This application claims benefit of international application PCT/FI94/00321 filed Jul. 12, 1994.

BACKGROUND OF THE INVENTION

The invention relates to a method for adjusting transmission power of a subscriber mobile station in a cellular radio system when a call is established, the system comprising at least one base station in each cell, communicating with the mobile stations located in the cell. In the system, the base station sends data about itself on at least one control channel common to all mobile stations. The system comprises at least one common control channel for transmitting Channel Requests from mobile stations to the base station to establish an actual connection on a traffic channel. In the system, the mobile stations can adjust their transmission power on the basis of the data transmitted from the base station on a control channel.

In a cellular network system, when a subscriber mobile station wants to contact a base station, it sends a Channel Request on a control channel of the cellular radio network allocated for the purpose. On the basis of the request, the base station allocates an actual channel to the mobile station for communication. The base stations, on the other hand, regularly send on common control channels data which allows the mobile stations to synchronize themselves with the base station. On the channels, the base stations identify the network, the frequencies on which the traffic and control channels are, and the mobile station to which an incoming call is addressed. In the idle mode (connected to the network, but not busy with a call), the mobile stations continuously listen to the base stations on the control channels.

It is previously known that the power level at which a mobile station sends a Channel Request and the first few messages on the actual traffic channel is the same with all the mobile stations located within the area covered by the base station. The base station sends data about this initial power level on common control channels with other data about the base station. When a connection has been established, the base station or base station controller starts to adjust the power of the mobile station, connection by connection, on the basis of the measuring results and the quality of the connection.

Although all the mobile stations located within the base station area send a Channel Request at the same power, the base station receiver detects great differences in the levels of signals from different mobile stations. This is due to the fact that the radio waves propagate differently on different connections. The mobile stations are usually divided at random over the base station area. Since the cells may be up to 30 km in diameter, the differences in the distances of the mobile stations from the base stations may be great. Since attenuation of radio waves is, on average, relative to the square of the travel distance of the waves, signals transmitted at the same power are received at very different power levels in the base station.

As the base station receives Channel Requests on the control channel, a great difference in the levels of successive signals causes problems in the receiver. The base station attempts to adjust the power levels when a connection has been established, but this is usually slow and interference cannot be avoided. For example in the GSM, when the base station receives a Channel Request from a nearby mobile station at a great power, the base station receiver may be saturated, and the following time slot is lost due to jitter of the receiver. This may happen even when the base station operates in compliance with the GSM recommendations. When a connection has been established, the base station adjusts the power of the mobile station, but if the desired power significantly differs from the power at which Channel Requests are transmitted, the adjustment may take several seconds, during which the mobile station interferes with the system.

SUMMARY OF THE INVENTION

The object of the present invention is to avoid great differences in the levels of received Channel Requests, and thus to eliminate the interference caused by them in the operation of the base station receiver.

This is achieved with the method of the invention, which is characterized in that the mobile station sends a Channel Request to a base station at a transmission power computed on the basis of the measured power of the signal received from the base station on a common control channel.

The invention also relates to a subscriber mobile station for use in a cellular radio system that comprises at least one base station in each cell, communicating with the mobile stations located in the cell. In the system, the base station sends data about itself on at least one control channel common to all mobile stations. The system comprises at least one common control channel for transmitting Channel Requests from mobile stations to the base station to establish a connection on a traffic channel. The mobile station comprises means for adjusting the transmission power on the basis of the data transmitted from the base station on a control channel. The mobile station of the invention is characterized in that the mobile station comprises means for computing, on the basis of the measured power of the signal received from the base station on a common control channel, the transmission power needed when a Channel Request is sent to the base station.

In the idle mode, the mobile stations are in continuous contact with the base station system. A mobile station can often receive a plurality of base stations, which may belong to different networks. It must be able to differentiate between the networks, and to select the most advantageous base station. To make these decisions, the mobile station needs information about the base stations. The base stations send the information on common control channels, which can be received by all mobile stations.

When the power of the signal received on a common control channel is measured in accordance with the present invention, the transmission power of the Channel Request can be adjusted to be such that the base station can receive the request without having too high signal levels interfere with its operation.

BRIEF DESCRIPTION OF THE DRAWINGS

In the following the invention will be described in greater detail by means of an example, with reference to the attached drawings, wherein FIG. 4a shows a block diagram of power adjustment of a mobile station in the idle mode, FIG. 4b shows a block diagram of a power adjustment algorithm during a connection set-up procedure.

DETAILED DESCRIPTION

The method of the present invention is suitable for use in all cellular network systems where the system includes at least one base station in each cell, communicating with the mobile stations located in the cell. In the system, the base station sends data about itself on at least one control channel common to all mobile stations. The system comprises at least one common control channel for transmitting Channel Requests from mobile stations to the base station to establish an actual connection on a traffic channel. In the system, the mobile stations can adjust their transmission power on the basis of the data transmitted from the base station on a control channel; It is particularly advantageous when used in the digital Pan-European mobile telephone system GSM, and in corresponding digital systems, such as DCS1800. In the following the primary embodiment of the invention will be described using the GSM as an example, but without limiting it thereto.

Figure 1:
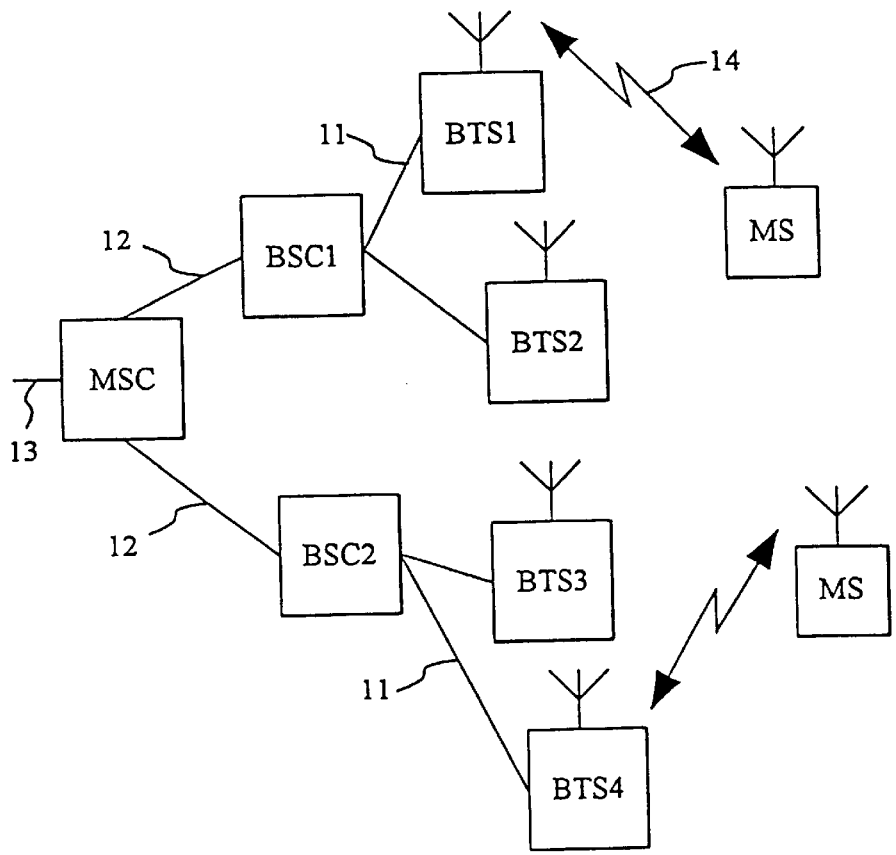
FIG. 1 shows a schematic view of part of a cellular radio system to which the method of the invention can be applied.

FIG. 1 shows a schematic view of the structure of the GSM cellular network system. To the Mobile Switching Centre MSC is connected, with digital transmission links 12, two Base Station Controllers BSC1 and BSC2. Link 13 indicates connection of the Mobile Switching Center MSC to other network system elements. To the base station controllers BSC1 and BSC2 are further connected, with digital transmission links 11, Base Stations BTS1, BTS2 and BTS3, BTS4, respectively. Each base station controller BSC with the base stations connected thereto forms a Base Station Sub-system BSS. The coverage area of one base station BTS typically forms one radio cell. The structure and characteristics of the GSM are described in greater detail in the GSM specifications, which are incorporated herein by reference.

Each base station has a certain number of physical radio channels, some of which are traffic 14 while others are common control channels. The traffic channels transmit both voice and data in the calls of the mobile stations located in the cell, and signalling traffic between the base station and the mobile stations. The common control channels are used for data transmission to mobile stations that are in the idle mode, and they are also employed in establishing a connection.

Figure 2:
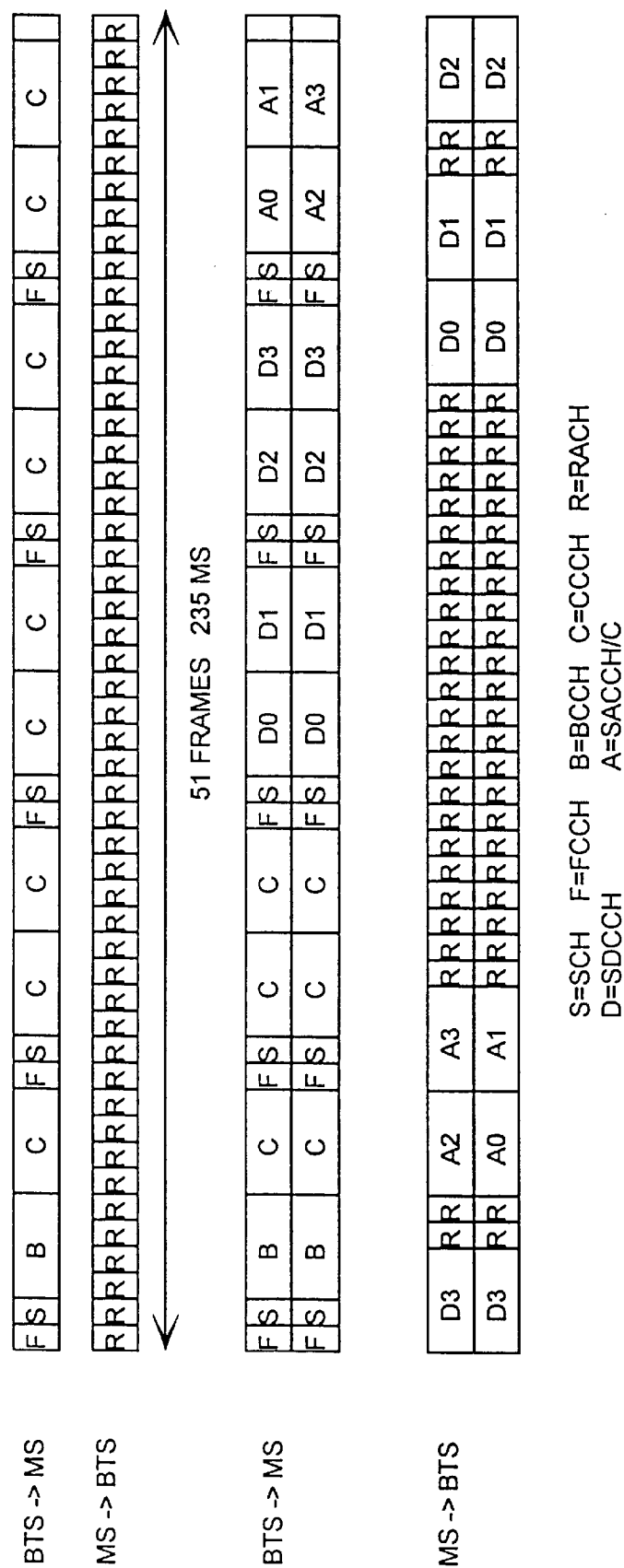
FIG. 2 illustrates different control channel multiframe structures of the GSM.

The physical channel of the GSM comprises Time Division Multiple Access TDMA frames, each of which advantageously comprises eight time slots, in which logical channels are transmitted. The logical channels comprise both the traffic channels and control channels. One multiframe comprises 51 or 26 TDMA frames. FIG. 2 illustrates different control channel multiframes used on the radio path, both from the base station BTS to the mobile station MS and from the mobile station MS to the base station BTS.

Logical channels essential to the invention include the Common Control Channels CCCH. In the GSM, the base stations send data about themselves on a Broadcast Control Channel BCCH, which is contained in the CCCH. On this channel, the mobile stations receive information about the identity of the cell, about the other common control channels of the cell, and about the power at which the base station is transmitting.

Before a connection set-up procedure is initiated, the mobile station is in the idle mode, in which it listens to the BCCH. The mobile station measures the power level of the received signal. Since the data transmitted on the BCCH also comprises data indicating at which power it has been transmitted from the base station, the mobile station is able to compute the current attenuation of the signal, caused by the radio path. On the basis of this, the mobile station is able to estimate the transmission power at which a Channel Request should be transmitted to the base station.

According to one advantageous embodiment of the invention, the base station may also send, on the BCCH, data indicating the desired power level of the Channel Request in a base station receiver. Typically, the desired power level may be e.g. −80 dBm. On the basis of this and the earlier computed attenuation on the radio path, the mobile station is able to directly compute the transmission power needed.

FIG. 4a illustrates the operation of the mobile station in the idle mode. The power level of the received BCCH signal in the receiver $P_{BCCH}$ is measured. Further, the mobile station reads, from the BCCH message, the power level $P_{BTS}$ at which the base station sent the message, and the power of the Channel Request, desired by the base station, in the base station receiver $P_{RQ}$.

Figure 3:
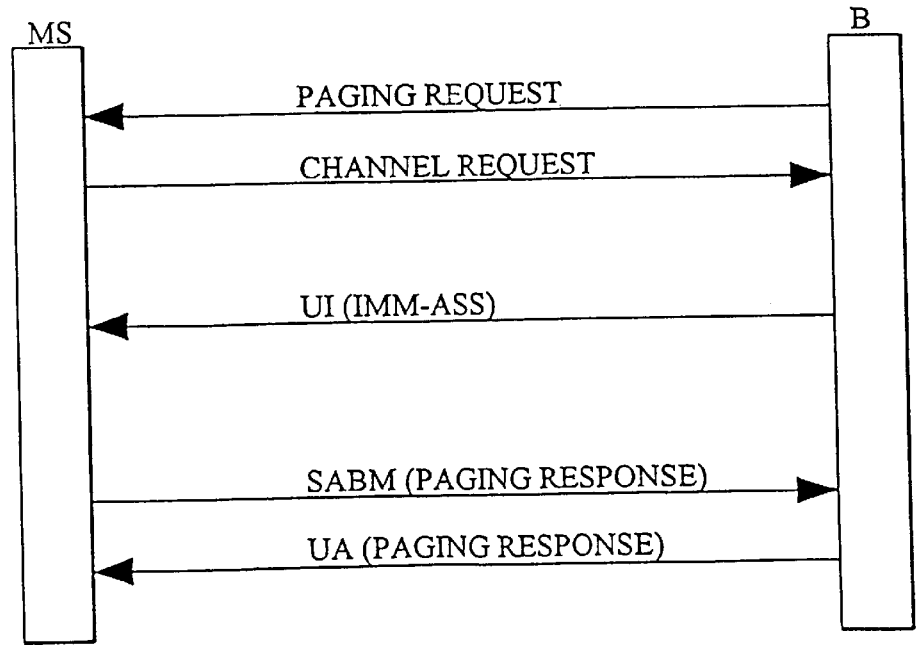
FIG. 3 shows a signalling scheme of a connection set-up procedure in the GSM.

The call set-up procedure is similar, whether initiated by the base station system or the mobile station. FIG. 3 illustrates the signalling that takes place as the base station system BSS pages a mobile station MS. FIG. 4b illustrates a power-computing-algorithm during the connection set-up procedure. When the base station system detects an incoming call addressed to a mobile station located within its coverage area, it sends a Paging Request on a Paging Channel PCH, which is contained in the CCCH. As the mobile station detects the call, it computes the power level needed for transmitting a Channel Request. To compute the power, the mobile station first computes the attenuation L on the radio path by subtracting the received power $P_{BCCH}$ from the power $P_{BTS}$ used by the base station. The power $P_{MS}$ needed for transmitting the Channel Request is obtained by then adding the computed attenuation L on the radio path to the desired power level $P_{RQ}$ received from the base station. The mobile station sends a Channel Request on a Random Access Channel RACH, which is contained in the CCCH, at the power level $P_{MS}$ computed by it. As the base station system receives a Channel Request, it has no information about the connection between the Channel Request and the earlier Paging Request. The base station system assigns a signalling channel SCCCH to the base station MS and informs the mobile station by sending an Immediate Assignment on an Access Grant Channel AGCH. When an SDCCH has been allocated to the mobile station, it sends a Paging Response on the channel, and the base station system transmits the response to the Visitors Location Register VRL. On the basis of the response, the VRL establishes a radio connection and then hands off the call control to the MSC.

When a connection has been established, the base station system starts to adjust the power of the mobile station. In order that the system might start the adjustment, it must have information about the power level at which the mobile station sent the Channel Request. The mobile station signals the power level it uses to the base station system, using either the SDCCH or SACCH signalling channel. After this, the power is adjusted in accordance with the GSM specifications.

Also when a mobile station initiates a call, the procedure is as described above, starting from the Channel Request.

Figure 5:
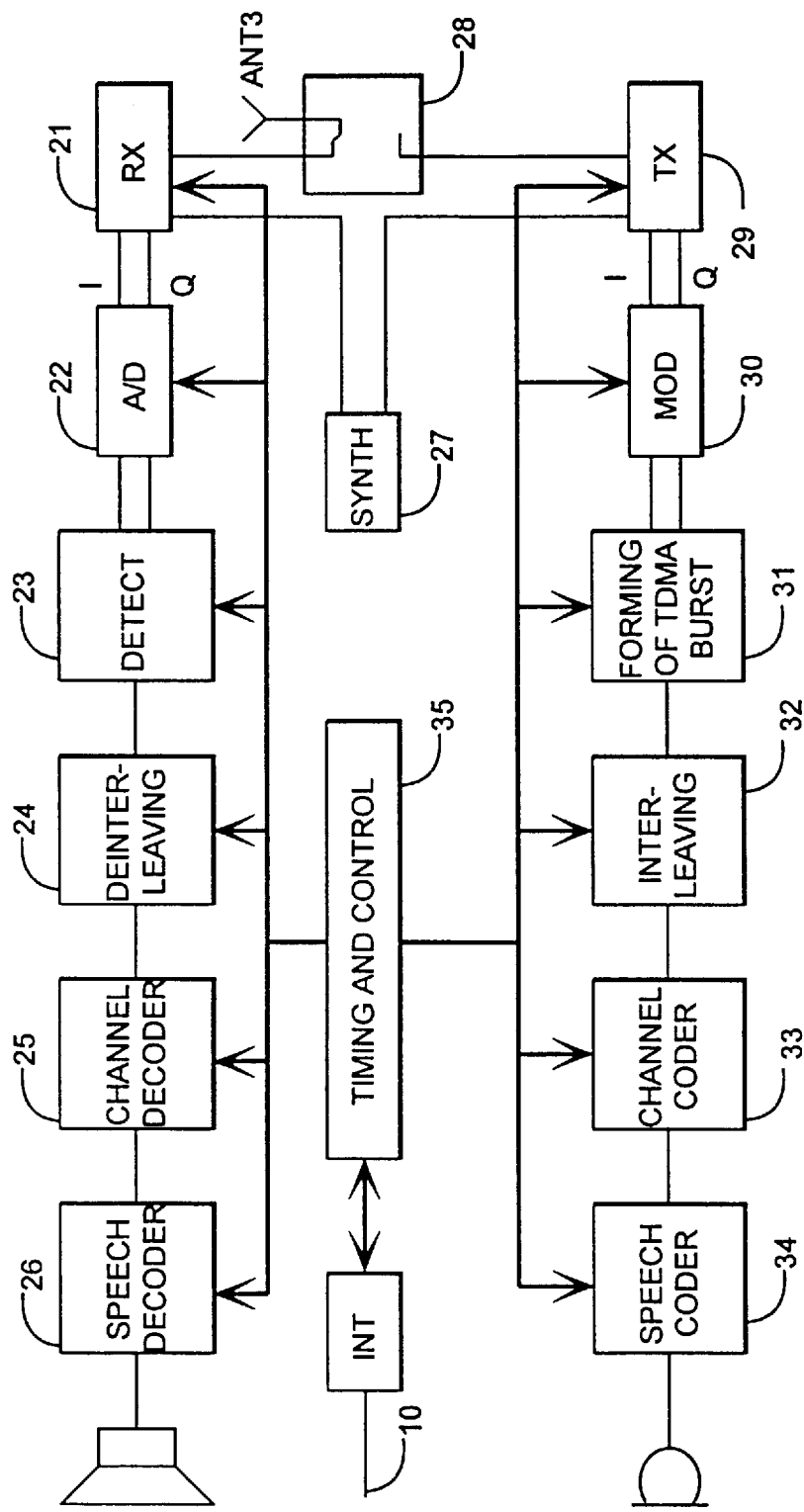
FIG. 5 illustrates the structure of a subscriber mobile station of the invention.

FIG. 5 illustrates the structure of a subscriber mobile station MS of the invention. The MS comprises an antenna 3, a duplex filter 28, a receiver 21, a transmitter 29 and a synthesizer 27. The signal received by the antenna 3 is supplied through the duplex filter to the receiver 21; and the signal is then converted in an A/D converter 22. The converted signal is supplied to a detector 23, after which demultiplexing 24 is performed. Channel decoding is performed in a channel decoder 25, and the signal is then supplied through a speech coder 26 to an amplifier. In the transmission direction, a signal supplied from a microphone is first subjected to speech coding 34, and then to channel coding in a channel coder 33. The signal is then multiplexed 32, and this is followed by TDMA burst formation 31; then the signal is supplied through a modulator 30 to the transmitter 29, and through the duplex filter 28 to the antenna. The MS also comprises means 35 that control all the above-mentioned blocks and are able to compute the transmission power needed for the Channel Request on the basis of the power of the signal transmitted on the common control channel. If the base station has announced on the common control channel the transmission power it uses, the means 35 can also directly compute the attenuation occurring on the radio path, and the transmission power needed can be estimated on the basis thereof. The subscriber mobile station of the invention can also be a mobile phone, a data mobile station or any other mobile station operating in the cellular radio system.

Although the invention is described above with reference to the example depicted in the attached drawings, it is to be understood that the invention is not restricted thereto but can be modified in many ways within the scope of the inventive idea presented in the attached claims.

We claim:

1. A method for adjusting transmission power of a subscriber mobile station in a cellular TDMA radio system when a call is established, the system comprising at least one base station in each cell, communicating with the mobile stations located in the respective said cell, said method comprising:

a respective said base station sending data about itself in a signal on at least one control channel common to all mobile stations in the respective said cell; a respective said mobile starting transmitting to said base station on at least one common control channel provided in said system for transmitting channel requests from mobile stations in said cell to said base station, a channel request to establish an actual connection on a traffic channel;

said mobile station adjusting transmission power on the basis of said data transmitted from said base station on said common control channel;

said mobile station sending said channel request to said base station at a transmission power computed by said mobile station on the basis of power of said signal as received from said base station on said common control channel, as measured by said mobile station; and wherein:

when a connection has been established with said base station, said mobile station sending data to said base station, on a common control channel of the system, about the power level used by said mobile station for transmitting said channel request.

2. The method of claim 1, wherein:

when the system adjusts the transmission power of the mobile station, the starting value is the starting transmission power given by said mobile station in said data sent to said base station.

* * * * *